United States Patent [19]

Suzuki et al.

[11] Patent Number: 5,762,422
[45] Date of Patent: Jun. 9, 1998

[54] BEARING APPARATUS FOR ELECTRICAL ROTATING MACHINE

[75] Inventors: Yuzuru Suzuki, Hamana-gun; Sakae Fujitani, Hamakita; Naoyuki Harada, Fukuroi, all of Japan

[73] Assignee: Minebea Co. Ltd., Nagano, Japan

[21] Appl. No.: 882,961

[22] Filed: Jun. 26, 1997

Related U.S. Application Data

[63] Continuation of Ser. No. 510,674, Aug. 3, 1995, abandoned.

[30] Foreign Application Priority Data

Aug. 3, 1994 [JP] Japan .................................. 6-201340

[51] Int. Cl.⁶ .................................................. F16C 17/08
[52] U.S. Cl. ........................... 384/245; 384/243; 384/255
[58] Field of Search ................................. 384/245, 243, 384/108, 255, 123, 115

[56] References Cited

U.S. PATENT DOCUMENTS

| | | | |
|---|---|---|---|
| 1,975,646 | 10/1934 | Luethy | 384/245 |
| 2,246,738 | 6/1941 | Lauck | 384/245 |
| 4,434,448 | 2/1984 | Bell et al. | |
| 4,798,476 | 1/1989 | Sakatani et al. | 384/245 |
| 4,856,918 | 8/1989 | Inque et al. | 384/108 |
| 5,277,499 | 1/1994 | Kameyama | 384/245 |

FOREIGN PATENT DOCUMENTS

| | | |
|---|---|---|
| 0 479 540 | 4/1992 | European Pat. Off. |
| 0 589 514 | 3/1994 | European Pat. Off. |

OTHER PUBLICATIONS

Patent Abstracts of Japan No. 4277316; vol. 11, No. 90 (03–87) (No Date).
Patent Abstracts of Japan No. 61241518; vol. 17, No. 77 (02–93) (No Date).

Primary Examiner—Lenard A. Footland
Attorney, Agent, or Firm—Staas & Halsey

[57] ABSTRACT

A bearing apparatus for use in an floppy disc drive device motor having a sleeve bearing and a thrust bearing is provided which is characterized in that there is provided a thrust bearing having such a convex portion, a projection, or a concave portion that makes the rotation shaft of the motor inclined with respect to the center axis of the sleeve bearing. Therefore, the rotation shaft ofa motor can be forcibly inclined with the rotation shaft and the sleeve bearing being kept in contact with each other. In addition, it is possible to reduce deviation in inclination of the motor rotation shaft and to ensure electric conductance between the motor rotation shaft and the motor body. These advantages are attained by a specific structure in which a projection, a convex portion, or a concave portion is provided at the thrust bearing, and therefore, the structure is simple and requires low costs.

12 Claims, 3 Drawing Sheets portion A

BEARING APPARATUS FOR ELECTRICAL ROTATING MACHINE

This application is a continuation, of application Ser. No. 08/510,674, filed Aug. 3, 1995, now abandoned.

BACKGROUND OF THE INVENTION

1. Field of the Invention

The present invention relates to a bearing apparatus for use in motor for floppy disc drive device, and more particularly, to a bearing apparatus for use in motor for a floppy disc drive device using a sleeve bearing.

2. Description of the Prior Art

A floppy disc drive device has been widely used for a computer external memory device, since it allows flexible replacements of floppy discs and easy treatments. Recently, there has been a tendency to down-sizing computers, and therefore, the floppy disc drive devices is included in micro-computers have come to follow this tendency. In addition, as the size of a floppy disc drive device is reduced, the motor for driving a floppy disc must be formed to have a small and thin size. Although conventional bearings for driving a floppy disc drive device have been of ball bearing type, bearings of the type as shown in FIG. 4 have been recently used for reasons as stated above.

In a conventional bearing apparatus for a floppy disc drive motor used in the floppy disc drive device, a rotation shaft 1 is supported by a sleeve bearing 7 and a thrustbearing 6, as shown in FIG. 5, and therefore, there is a small gap in the radial direction. So that, when an external force is applied to a rotor yoke or when a magnetic unbalance occurs, inclination of the rotation shaft 1 changes. As a result, read/write characteristics of the floppy disc drive device are deteriorated in some cases. Therefore, a concept of a dynamic pressure type bearing using a fluid such as an oil or the like has been proposed as a method of filling the radial gap. The rotation speed of floppy disc drive device drive motor is about 300 rpm, so that sufficient effects cannot be obtained by a dynamic pressure type bearing using a fluid like an oil. When the dynamic pressure type bearing has used, and even if the rotation shaft 1 can be supported to stand vertically and stable rotation can be obtained, floppy disc drive device chassis is electrically isolated from the rotation shaft 1, so that it is not possible to form a circuit for discharging static electricity to generate on a floppy disc surface with rotation, which is necessary for floppy disc drive device drive motor to prevent magnetic (read/write) heads from discharge noise and insulation damage.

SUMMARY OF THE INVENTION

The present invention has been made to improve drawbacks of a conventional apparatus as stated above, and an object of the present invention is to provide a bearing apparatus for electrical rotating machine, especially for floppy disc drive device drive motor which has a simple structure, which ensures a sufficient rotation accuracy of a rotational shaft to prevent deterioration in read/write characteristics of floppy disc drive device, and which can discharge static electricity of an floppy disc.

To achieve the above-mentioned objects of the present invention, the present invention provides a bearing apparatus for electrical rotating machine having a field coil and field magnet rotating respectively, characterized in that the rotating machine has a rotation shaft as a rotation center that is rotatably supported, a sleeve bearing for rotatably supporting the rotation shaft within a sleeve member having a sleeve shape, and a thrust bearing provided on a bottom surface of the sleeve bearing, for receiving an end of the rotation shaft, and that a concave or convex portion is formed on an upper surface of the thrust bearing to form a stable contact portion between the end of the bottom of the rotation shaft and the thrust bearing and a stable contact portion between a side surface of the rotation shaft and a sleeve bearing, by deviating the rotation shaft with respect to the sleeve bearing.

Since the rotation shaft of the rotating machine is actively inclined, swinging movements of the rotation shaft is reduced and rotation of the rotating machine is stabilized, so that effective reading/writing operation of the floppy disc drive device is realized. Further, electric conductance is ensured between the rotation shaft and the sleeve bearing, so that static electricity is discharged from a floppy disc.

DESCRIPTION OF THE PREFERRED EMBODIMENT(S)

Figure 1:
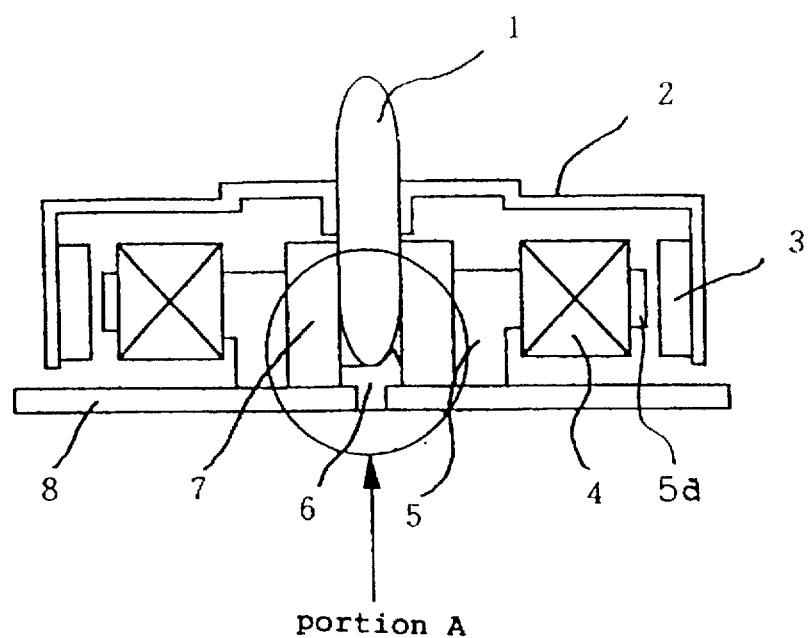
FIG. 1 is a cross-sectional view showing a first embodiment of the present invention.

An embodiment of the present invention will be described below with reference to the drawings. FIG. 1 is a cross-sectional view of a floppy disc drive device drive motor using a bearing apparatus according to the present invention. In this figure, reference 1 denotes a rotation shaft of a motor, and reference 2 denotes a rotor yoke. The rotor yoke 2 is formed in a disc-like shape by punching a permeable soft iron plate by press-processing, and a hole for allowing the rotation shaft 1 to penetrate is formed in the center of the yoke. The rotation shaft 1 is forcibly engaged in the hole, and thus, the rotor yoke 2 is finally fixed to the rotation shaft 1. When the floppy disc drive device drive motor is incorporated in the floppy disc drive device, floppy disc is mounted on the upper surface of the rotor yoke 2, so that the floppy disc rotates as the rotor yoke 2 rotates. A magnet 3 formed of hard ferrite or hard rubber and hard ferrite particles mixed and kneaded there into is in side the peripheral portion of the rotor yoke 2. This magnet 3 is magnetized such that N- and S-poles alternately appear along the circumferential direction of the rotor yoke 2. Reference 4 denotes a stator coil, and reference 5 denotes a stator yoke. References 6, 7, and 8 respectively denote a thrust bearing, a sleeve bearing, and a motor frame. Further, the stator yoke 5 is fixed on the motor frame 8. A sleeve bearing 7 is installed in the center of the stator yoke 5, and the rotation shaft 1 is rotatably supported by the bearing 7, which will be described in more detail later.

The stator yoke 5 is provided with a plurality of magnetic poles formed in a star-like arrangement, in the direction from the center toward the magnet 3. A stator coil 4 is wound near the tops of the star-like arrangement. Moreover, a specific explanation will be omitted except for the bearing structure described below, since the structure and operation of the motor shown in FIG. 1 are well-known.

Figure 2:
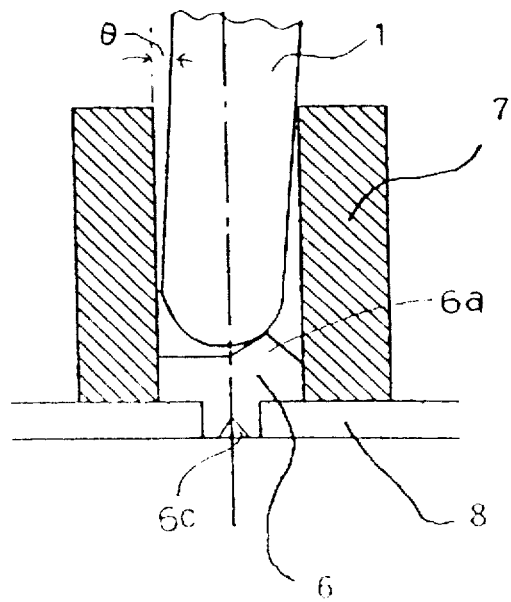
FIG. 2 is an enlarged view showing a bearing portion according to the first embodiment of the present invention.

FIG. 2 is an enlarged cross-sectional view showing a part of bearing portion (i.e., portion A) shown in FIG. 1. As can be seen from FIG. 2, a thrust bearing 6 is provided on the internal bottom surface of the sleeve bearing 7 having a sleeve shape whose bottom portion is fixed to the motor frame 8. A projection 6a is provided in the bottom portion 8 of the thrust bearing 6, and this projection 6a is engaged in a hole formed in the motor frame. The end of the bottom portion of the rotation shaft 1 has a hemispheric shape. A conical projection 6a is provided on the upper surface of the thrust bearing 6 at a deviated portion thereof, i.e., at a position offset from the center line of the sleeve bearing 7 indicated by one-dot-dashed line in the figure.

Operation of the above embodiment will be explained in the next. At first, if a rotation shaft 1 is inserted in a sleeve bearing 7 in an floppy disc drive device drive motor, as shown in FIG. 1, a magnet 3 and fixed magnetic poles at ends of a stator yoke 5 attract each other, so that the rotor yoke 2 is attracted in the direction toward the motor frame 8 until the end of the rotation shaft 1 is brought into contact with a thrust bearing 6. When the floppy disc drive device drive motor is rotated in this condition, the rotor yoke 2 rotates with maintaining this condition. However, since there is an actual clearance between the rotation shaft 1 and the sleeve bearing 7, the rotor yoke 2 rotates with itself slightly inclined in a particular direction due to lack of uniformity in sizes of the gaps between the magnet 3 of the rotor yoke 2 and the fixed magnetic poles 5a and in magnetomotive force of the stator coil 4. Therefore, according to the present invention, in order to previously incline the rotation shaft 1 at a predetermined angle θ° the bottom portion of the rotation shaft 1 is formed in a hemispheric shape and a projection 6a is provided on the upper surface of the thrust bearing 6 at a portion offset from the center thereof, so that the rotation shaft 1 is inclined by a gap amount between the rotation shaft 1 and the sleevebearing 7. Consequently, as shown in FIG. 2, the end of the bottom portion of the rotation shaft 1 is in contact with the thrust bearing 6, and the side wall of the rotation shaft 1 is in contact with the sleeve bearing 7. The rotation shaft thus attains three contact points and is stably supported by these contact points. In addition, since the sleeve bearing 7 is thus continuously kept in direct contact with the rotation shaft 1, static electricity charged in the rotor yoke 2 from an attached floppy disc escapes in the direction toward the motor frame 8 through the rotation shaft 1 and the sleeve bearing 7. Therefore, static electricity is not charged in the rotor yoke 2.

Figure 3:
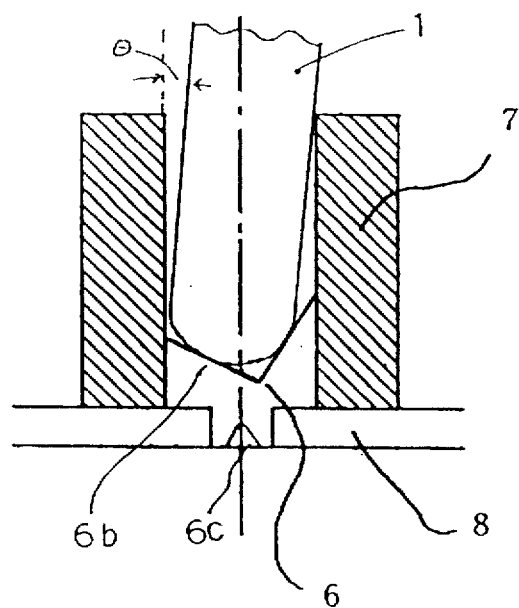
FIG. 3 is an enlarged view showing a bearing portion according to a second embodiment of the present invention.
Figure 4:
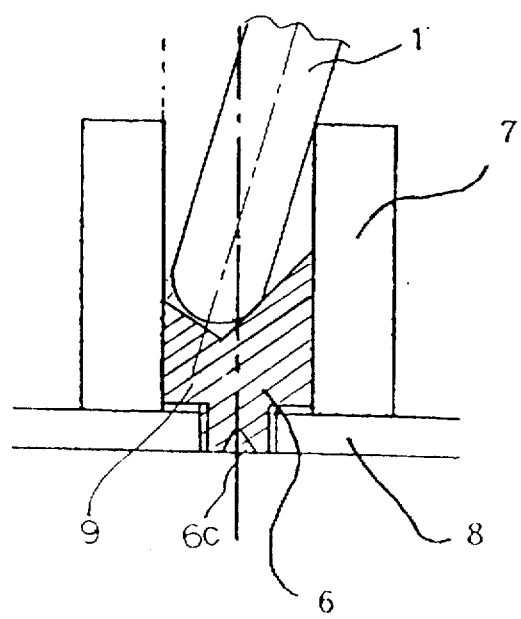
FIG. 4 is a cross-sectional view showing a part of an other embodiment.
Figure 5:
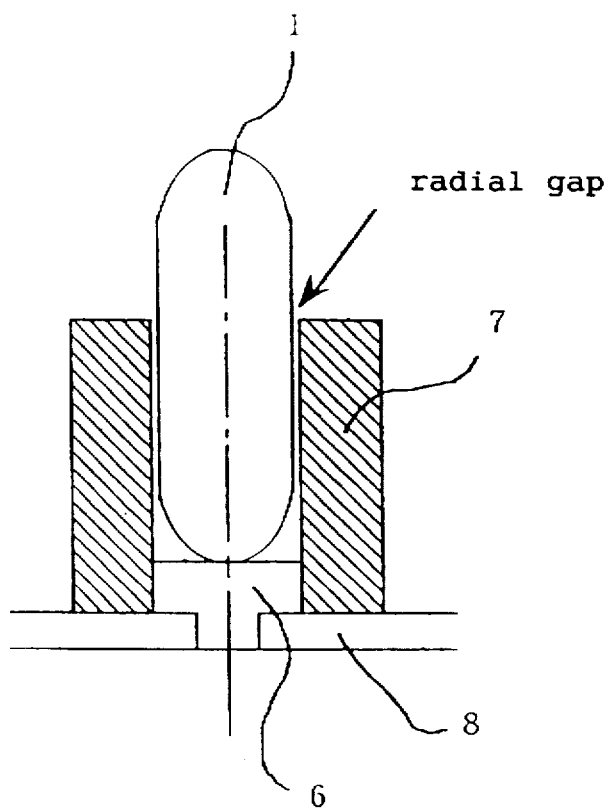
FIG. 5 is an enlarged view showing a bearing portion of a conventional motor.

FIG. 3 is a partial enlarged cross-sectional view showing another embodiment of the present invention. In this embodiment, a conical concave hole 6b is formed in the upper surface of a thrust bearing 6, and the end of the bottom portion of this concave hole 6b is situated at a deviated portion, i.e., a position offset from the center line of the sleeve bearing 7 indicated by one-dot-dashed line. Moreover those portions which are common to the portions of FIG. 1 are referred to by the same reference symbols, and explanation thereof will be omitted herefrom.

Thus, in the second embodiment, a concave hole 6b is formed at a deviated portion offset from the center line of the sleeve bearing 7, and therefore, the rotation shaft 1 is inclined by a gap amount between the rotation shaft 1 and the sleeve bearing 7, like in the first embodiment. As a result, the rotation shaft 1 is in contact with the sleeve bearing 7 by three points and is stably supported by these contact points, so that the rotation shaft rotates stably.

In the first and second embodiments, the thrust bearing 6 is press-fitted and fixed to the hole formed in the motor frame 8 when assembling the motor. Therefore, it is not possible to perform fine adjustment of positional relationship between the thrust bearing and the rotation shaft after assembling the motor. In the next embodiment, for example, an engagement hole 6c is provided in a bottom portion of the thrust bearing 6 to constitute a rotation portion, as shown in FIGS. 2 and 3, and the thrust bearing 6 is rotatably installed on the motor frame 8 when assembling the motor. After assembling the motor, the rotating position of the thrust bearing 6 is adjusted with a screw driver when testing rotation of an floppy disc drive device motor, to attain the position where the rotation shaft 1 rotates at the highest stability. Thereafter, the thrust bearing 6 is fixed to the motor frame 8 by means of an adhering or brazing method or the like. In case where the size of the shaft in the thrust direction requires a high accuracy, a screw portion 9 is provided on an engaging surface of the thrust bearing 6 to be engaged with the motor frame 8, thereby to fix the thrust bearing 6 to the motor frame 8. Otherwise, in case where the inclination direction of the rotation shaft 1 has already been decided before the assembling of the motor is started, the thrust bearing 6 can be fixed at a particular position to the motor frame 8. Therefore, the thrust bearing 6 is engaged in the motor frame 8 in such a manner in which the thrust bearing 6 does not rotate in relation to the motor frame 8. In this case, the cross-sections to be engaged with each other may be D- or I-shaped or may be of a convex shape or the like.

In each of the first and second embodiments, the projection or concave hole is provided on the upper surface of the thrust bearing at a position offset from the center line of the sleeve bearing and is thus deviated. However, if the projection or concave hole is provided on the center line, it is possible to form a stable contact portion between the bottom end of the rotation shaft and the thrust bearing as well as a stable contact portion between the side wall of the rotation shaft and the sleeve bearing, by deviating the rotation shaft from the sleeve bearing.

Above mentioned embodiments are related to the motor for floppy disc drive device. But it is understood that the present invention will be applied for a bearing of generator.

According to the present invention, the rotation shaft of a motor can be forcibly inclined with the rotation shaft and the sleeve bearing being kept in contact with each other. Therefore, it is possible to reduce deviation in inclination of the motor rotation shaft and to ensure electric conductance between the motor rotation shaft and the motor body. These advantages are attained by a specific structure in which a projection, a convex portion, or a concave portion is provided at the thrust bearing, and therefore, the structure is simple and requires low costs.

As many widely different embodiments of the present invention may be made without departing from the spirit and scope thereof, it is to be understood that the invention is not limited to the specific embodiments thereof except as defined in the appended claims.

What we claim is:

1. A bearing apparatus for an electrical rotating machine having a rotation shaft being subject to a thrust force, comprising:

said rotation shaft having a curve shaped end of a spherical protrusion and supporting rotatable parts of said electrical rotating machine;

a cylindrical sleeve bearing which supports said rotation shaft within the cylindrical sleeve of said cylindrical sleeve bearing;

a thrust bearing provided at the bottom of said cylindrical sleeve bearing;

a minimum space between an inner wall of said cylindrical sleeve bearing and an outer surface of said rotation shaft for slidable rotation of said rotation shaft;

a surface shape of said thrust bearing contacting said spherical protrusion taking the form other than rotation symmetry with respect to a central axis of said cylindrical sleeve;

whereby said cylindrical sleeve keeps said rotation shaft inclined within said minimum space, a stable contact portion between said curve shaped end of said spherical protrusion of said rotation shaft and said surface of said thrust bearing excepting the central part thereof is formed, and a stable contact portion between said outer surface of said rotation shaft and said inner wall of said cylindrical sleeve bearing is formed.

2. A bearing apparatus for an electrical rotating machine according to claim 1, wherein a bottom portion of said curved shaped end of said spherical protrusion of said rotation shaft has a round shaped surface.

3. A bearing apparatus for an electrical rotating machine according to claim 1, wherein said surface shape of said thrust bearing has a concave portion with a top that is deviated from said central axis of said cylindrical sleeve bearing.

4. A bearing apparatus for electrical rotating machine, according to claim 1, characterized in that said concave portion is formed at a portion deviated from a center of said upper surface of said thrust bearing.

5. A bearing apparatus for an electrical rotating machine according to claim 1, wherein said surface shape of said thrust bearing has a convex portion accommodating a part of said curve shaped end of said spherical protrusion, and the lowest part of said convex portion is deviated from said central axis of said cylindrical sleeve bearing.

6. A bearing apparatus for an electrical rotating machine according to claim 5, wherein said convex portion is formed at a portion deviated from a center of an upper surface of said thrust bearing.

7. A bearing apparatus for an electrical rotating machine according to claim 1, wherein said at least one of said cylindrical sleeve bearing and said thrust bearing is made from metal and is connected to a grounded portion.

8. A bearing apparatus for an electrical rotating machine according to claim 1, wherein said thrust bearing is able to rotate against said cylindrical sleeve bearing for adjusting an inclination of said rotation shaft.

9. A bearing apparatus for an electrical rotating machine according to claim 1, wherein said thrust bearing is able to move for thrust direction of said rotation shaft for adjusting a position of said rotation shaft.

10. A bearing apparatus for an electrical rotating machine according to claim 1, wherein said thrust bearing is tightly fixed to said cylindrical sleeve bearing.

11. A bearing apparatus for an electrical rotation machine according to claim 1, wherein said electrical rotation machine is a generator.

12. A bearing apparatus for an electrical rotation machine according to claim 1, wherein said rotating machine is a motor.

* * * * *